United States Patent
Chen

(10) Patent No.: US 6,996,218 B2
(45) Date of Patent: Feb. 7, 2006

(54) FSK DECODER FOR CALLER ID

(75) Inventor: Yueh-Chang Chen, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 254 days.

(21) Appl. No.: 10/633,502

(22) Filed: Aug. 5, 2003

(65) Prior Publication Data

US 2005/0031105 A1    Feb. 10, 2005

(51) Int. Cl.
*H04M 1/56*       (2006.01)
*H04M 15/06*      (2006.01)

(52) U.S. Cl. .......................... 379/142.01; 379/142.04; 379/142.18; 379/283

(58) Field of Classification Search .. 379/88.19–88.21, 379/93.23, 142.01–142.18, 275–276, 372, 379/283

See application file for complete search history.

(56) References Cited

U.S. PATENT DOCUMENTS 5,970,128 A * 10/1999 Kim ...................... 379/142.01
6,160,857 A * 12/2000 Yang .......................... 375/334
6,265,948 B1 * 7/2001 Stevenson ................... 332/101
6,480,589 B1 * 11/2002 Lee et al. .............. 379/142.04

* cited by examiner

*Primary Examiner*—Duc Nguyen
(74) *Attorney, Agent, or Firm*—Finnegan, Henderson, Farabow, Garrett & Dunner, L.L.P.

(57) ABSTRACT

A device for processing a frequency shift keying (FSK) signal including caller ID information that comprises an analog-to-digital converter (ADC) converting the FSK signal into a digital FSK signal, the FSK signal further comprising a first frequency component, a second frequency component including the caller ID information, and a third frequency component, a first filter attenuating the first and third frequency components of the digital FSK signal to provide a first signal, a second filter attenuating the second frequency component of the digital FSK signal to provide a second signal, and a circuit calculating an energy level for each of the first and second signals, and selecting the first signal for output if the energy level of the first signal is smaller than that of the second signal, and selecting the digital FSK signal for output if the energy level of the first signal is greater than that of the second signal.

20 Claims, 5 Drawing Sheets

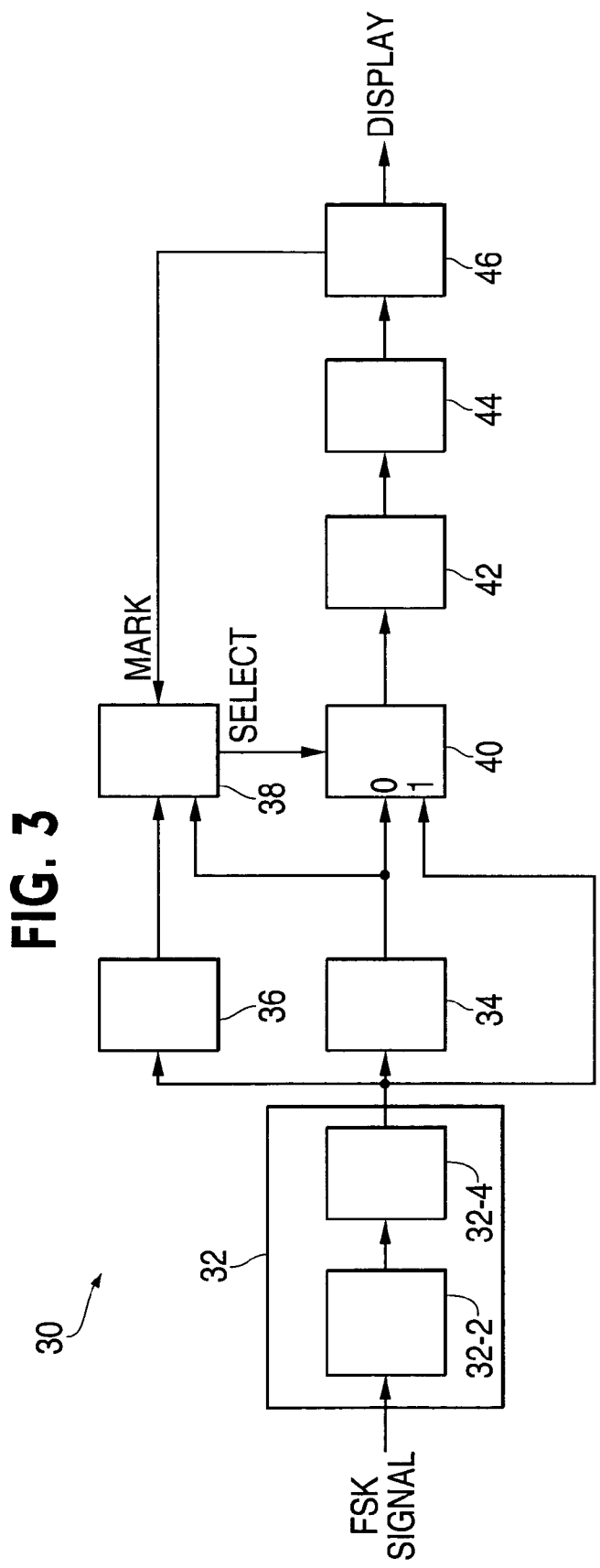

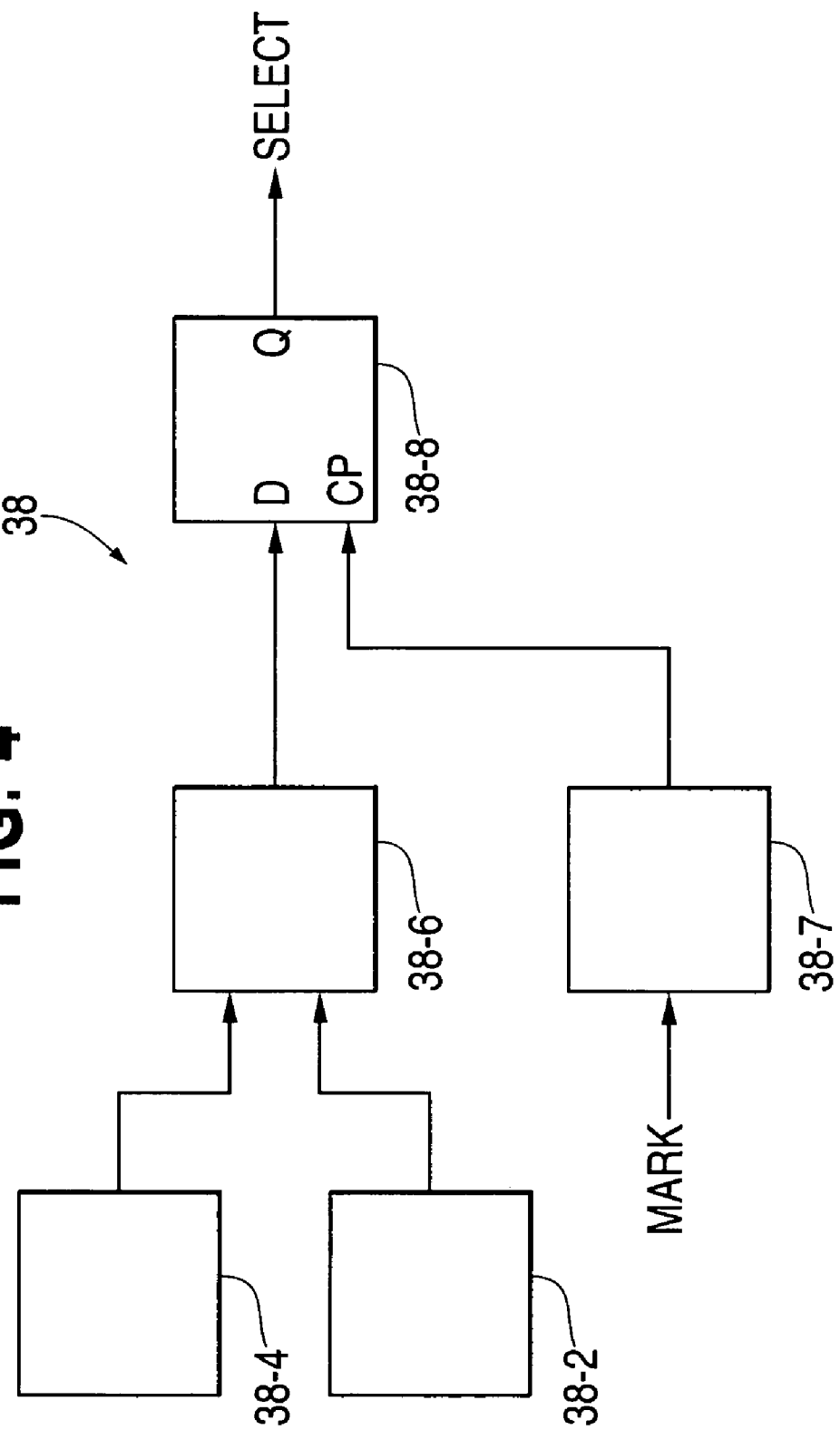

FSK DECODER FOR CALLER ID

FIELD OF THE INVENTION

This invention pertains in general to processing signals including call-related information and more particularly, to a device and a method of processing signals including caller ID information.

BACKGROUND OF THE INVENTION

Telephone companies generally provide a service for displaying call-related information of a calling party to the called party before the call is answered. The call-related information may include the telephone number and household name of a calling party. One call-related information service, for example, is called Calling Identity Delivery ("Caller ID"). Display of the caller ID information allows a called party the option of not answering an incoming call. In general, basic caller ID information is transmitted from a local telephone company to a called party while the called party's phone is in a hung-up or on-hook state. For call-waiting, caller ID information is displayed even in a pick-up or off-hook state.

Typically, a carrier signal may be modulated in amplitude, phase, or frequency depending upon a particular application. Conventional techniques in the art for modulating the amplitude, phase, and frequency of a carrier signal may include amplitude shift keying ("ASK"), phase shift keying ("PSK"), and frequency shift keying ("FSK"). In any of these modulation techniques, the modulated carrier signal takes on one of two states, that is, either one of two amplitudes, two phases, or two frequencies. The two states of the modulated signal then represent either a logic one or a logic zero.

Conventional specifications in the art for transmitting a carrier signal including caller ID information may use FSK modulation in transmitting data. For example, a 1200-Hz (Hertz) signal denotes a digital logic "one" and a 2200-Hz signal denotes a digital logic "zero." FSK modulation offers a number of advantages in certain applications over other modulation techniques with respect to noise immunity and average signal power level.

A conventional device 10 for processing FSK signals including caller ID information is shown in FIG. 1. Referring to FIG. 1, device 10 includes a sigma-delta ($\Sigma$-$\Delta$ or SD) modulator 12, a sinc filter 14, a biquad filter 16, a digital comparator 18, a match filter 20, and a decoder 22. SD modulator 12 receives an input, analog FSK signal including caller ID information and converts the analog FSK signal into a serial digital stream. Sinc filter 14 down-samples the serial digital stream in a digitized sine waveform. The out-band noise of the digitized sine wave is filtered out by biquad filter 16. Digital comparator 18 then shapes the digitized sine wave into a square-wave. Match filter 20 assigns a logic one or logic zero to the digitized FSK signals. Decoder 22 then decodes the output from match filter 20 to display the caller ID information.

The FSK signals are transmitted from an exchanger located in a central office of a telephone service provider, and may be subjected to attenuation during the transmission, resulting in a twist in frequency, baud rate or amplitude of the FSK signals received by device 10. To ensure that a device is able to process attenuated FSK signals including caller ID information, an exchanger issues a test signal to test the device. The test is divided into two parts including:

(1) The exchanger issues an out-band noise signal with signal-to-noise ratio (SNR) of −20 dB at 200 Hz or 3200 Hz; and (2) The FSK signals include a 1% shift in baud rate, and ±10 dB twist in the amplitude of logic one or logic zero signals.

Biquad filter 16 generally includes an infinite impulse response ("IIR") filter to filter out out-band noises. However, an IIR produces a non-linear phase output that may adversely affect a FSK signal, particularly when the FSK signal includes an amplitude twist.

FIGS. 2A to 2C are diagrams exemplarily illustrating the distortion of FSK signals caused by biquad filter 16. FIG. 2A shows a waveform of an input FSK signal including a SNR of 20 dB and a twist of +10 dB. As noted above, a 1200-Hz signal denotes a digital logic "one" and a 2200-Hz signal denotes a digital logic "zero". The +10 dB twist indicates that the amplitude of a 1200-Hz signal is $10^{0.5}$ times of that of a 2200-Hz signal.

FIG. 2B shows a waveform of a sinc filter output. Referring to FIG. 2B, the 1200-Hz signals are recognizable from the 2200-Hz signals.

FIG. 2C shows a waveform of a biquad filter output. Referring to FIG. 2C, the 1200-Hz signals are hardly recognizable from the 2200-Hz signal due to the phase delay caused by the biquad filter. As a result, it is difficult for a match filter to correctly assign a corresponding logic value to the 1200-Hz and 2200-Hz signals.

SUMMARY OF THE INVENTION

Accordingly, the present invention is directed to a device and a method that obviate one or more of the problems due to limitations and disadvantages of the related art.

To achieve these and other advantages, and in accordance with the purpose of the invention as embodied and broadly described, there is provided a device for processing a frequency shift keying (FSK) signal including caller ID information that comprises an analog-to-digital converter (ADC) converting the FSK signal into a digital FSK signal, the FSK signal further comprising a first frequency component, a second frequency component including the caller ID information, and a third frequency component, a first filter attenuating the first and third frequency components of the digital FSK signal to provide a first signal, a second filter attenuating the second frequency component of the digital FSK signal to provide a second signal, and a circuit calculating an energy level for each of the first and second signals, and selecting the first signal for output if the energy level of the first signal is smaller than that of the second signal, and selecting the digital FSK signal for output if the energy level of the first signal is greater than that of the second signal.

In one aspect, the ADC further comprises a sigma-delta modulator modulating the FSK signal in a serial digital stream, and a sinc filter down-sampling the serial digital stream.

In another aspect, wherein the circuit selects one of the first signal or the digital FSK signal for output in response to a mark signal.

Also in accordance with the present invention, there is provided a device for processing a frequency shift keying (FSK) modulated caller ID information that comprises an analog FSK signal further comprising a first frequency component including test information, and a second frequency component including the caller ID information, an analog-to-digital converter (ADC) converting the analog FSK signal into a digital FSK signal, a bandpass filter attenuating the first frequency component of the digital FSK signal to provide a first signal, a bandstop filter attenuating the second frequency component of the digital FSK signal to provide a second signal, and a circuit detecting an energy level each for the first and second signals, comparing the energy levels, and selecting the first signal for output if the energy level of the first signal is smaller than that of the second signal, and selecting the digital FSK signal for output if the energy level of the first signal is greater than that of the second signal.

Still in accordance with the present invention, there is provided a method of processing a frequency shift keying (FSK) modulated caller ID information that comprises the steps of providing an analog FSK signal further comprising a first frequency component, a second frequency component including the caller ID information, and a third frequency component, converting the analog FSK signal into a digital FSK signal, attenuating the first and third frequency components of the digital FSK signal to provide a first signal, attenuating the second frequency component of the digital FSK signal to provide a second signal, determining an energy level for each of the first and second signals, selecting the first signal for output if the energy level of the first signal is smaller than that of the second signal, and selecting the digital FSK signal for output if the energy level of the first signal is greater than that of the second signal.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

BRIEF DESCRIPTION OF THE DRAWINGS

FIG. 3 is a block diagram of a device for processing FSK signals including caller ID information in accordance with one embodiment of the present invention.

FIG. 4 is a block diagram of a circuit included in the device shown in FIG. 3.

DESCRIPTION OF THE EMBODIMENTS

Reference will now be made in detail to the present embodiment of the invention, an example of which is illustrated in the accompanying drawings. Wherever possible, the same reference numbers will be used throughout the drawings to refer to the same or like parts.

Figure 1:
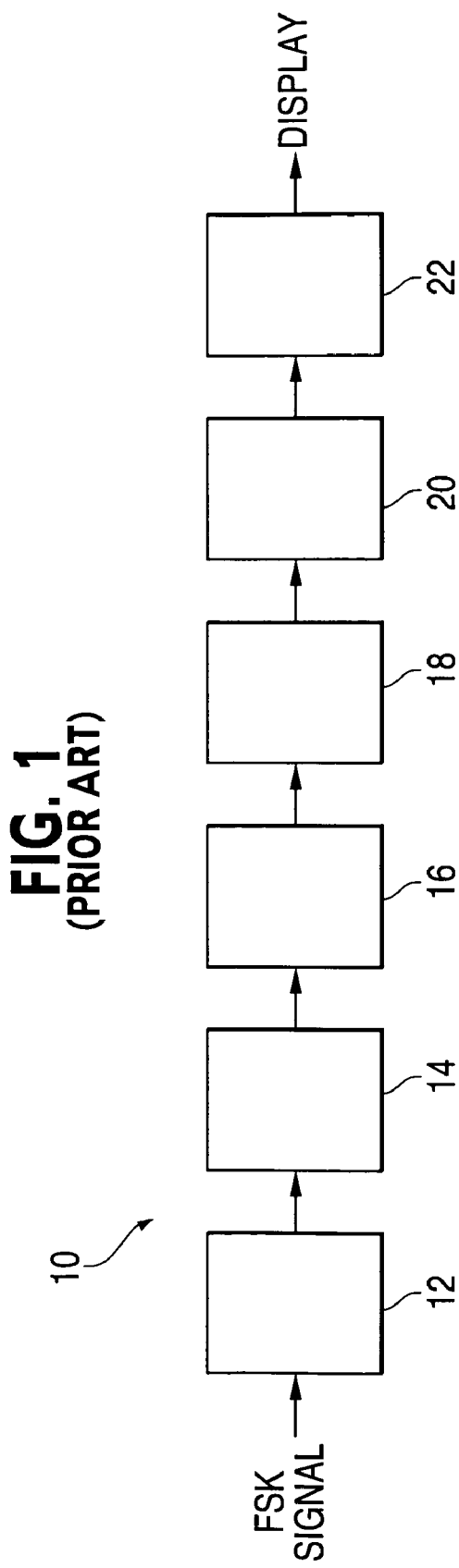
FIG. 1 is a block diagram of a conventional device in the art for processing FSK signals including caller ID information.
Figure 2A:
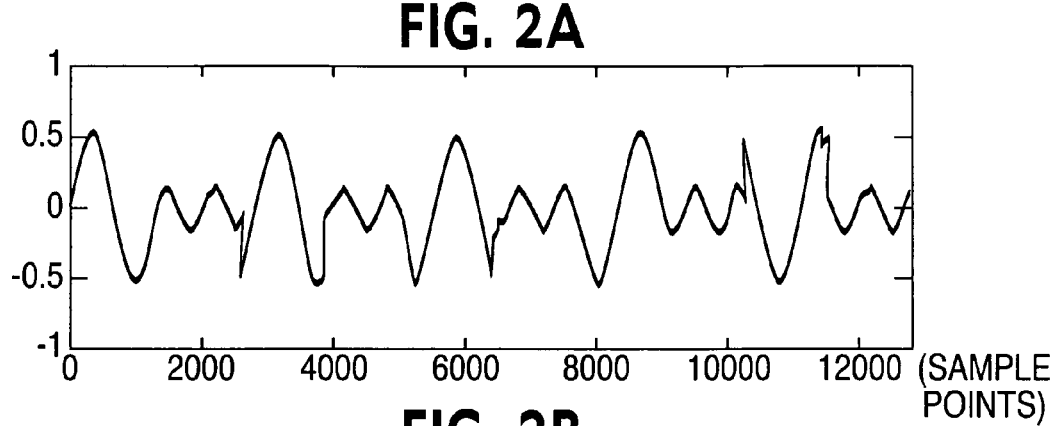
FIGS. 2A to 2C are diagrams exemplarily illustrating the distortion of FSK signals caused by a biquad filter.
Figure 2B:
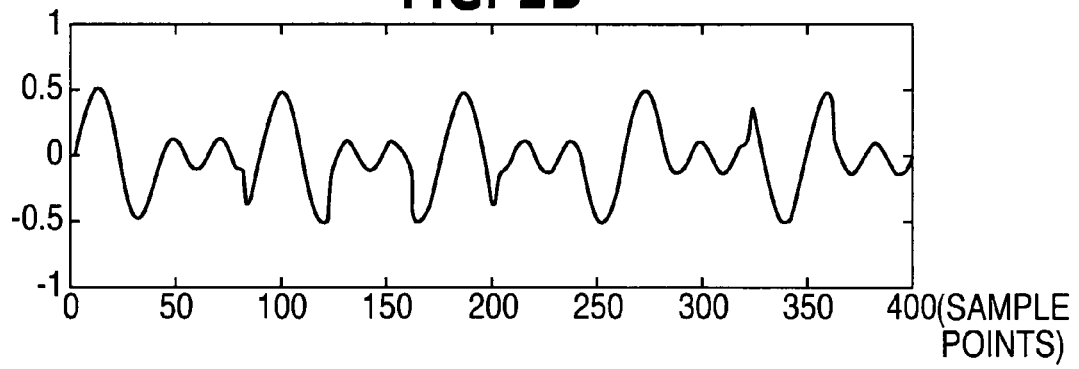
Figure 2C:
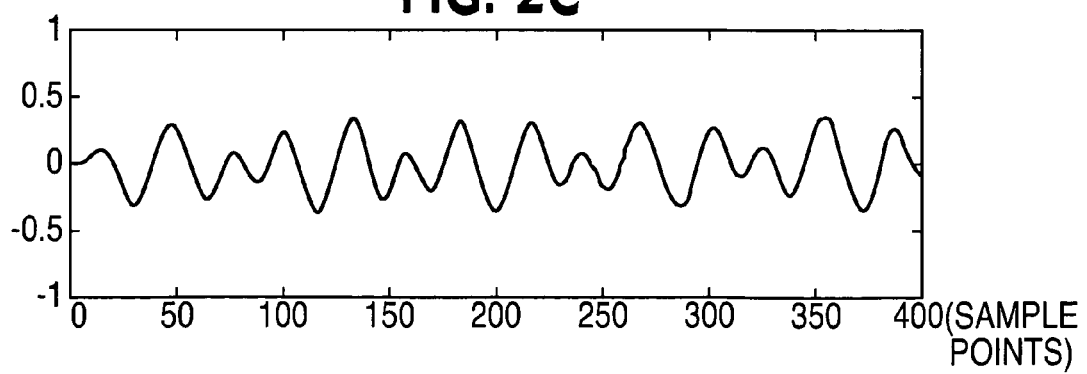

As noted from FIGS. 2B and 2C, a FSK signal after being processed by a sinc filter is recognizable by a match filter, but may become distorted and unrecognizable after processing by a biquad filter. For a FSK signal with a SNR of, for example, 20 dB, as the energy level of a noise is considerably smaller that that of the FSK signal, the biquad filter function for filtering out an out-band noise may be eliminated. That is, the output of a sinc filter, which is highly recognizable, may bypass a biquad filter, and be directly sent to a match filter through a digital comparator. Based on this methodology, a device for decoding caller ID information according to the present invention is constructed.

FIG. 3 is a block diagram of a device 30 for processing FSK-modulated caller ID information in accordance with one embodiment of the present invention. Referring to FIG. 3, device 30 includes an analog-to-digital converter ("ADC") 32, a first filter 34, a second filter 36, a circuit 38, and a multiplexer 40. ADC 32 receives an analog FSK signal transmitted from an exchanger, and converts the analog FSK signal into a digital FSK signal. The analog FSK signal includes a first frequency component, a second frequency component including the caller ID information, and a third frequency component. The first, second and third frequency components of the analog FSK signal may respectively correspond to a lower, intermediate and higher frequency bands. At least one of the first or third frequency components may include test information sent with the caller information from the exchanger.

In one embodiment according to the invention, ADC 32 includes a sigma-delta ("SD") modulator 32-2 and a sinc filter 32-4. SD modulator 32-2 modulates the analog FSK signal into a serial digital stream, for example, a 1.536-MHz binary data stream. Sinc filter 32-4, coupled to SD modulator 32-2, down-samples the serial digital stream to provide the digital FSK signal. For example, sinc filter 32-4 down converts the 1.536-MHz binary data stream into a 48-KHz sinewave-like data stream. As a result, a 1200-Hz signal, i.e., a digital logic "one" includes 40 (=48 KHz/1200 Hz) sample points composed of 20 continuous, high voltage level points followed by 20 continuous, low voltage level points. On the other hand, a 2200-Hz signal, i.e., a digital logic "zero", is composed of a serial of 11 high, 11 low, 11 high and 7 low voltage level points.

The digital FSK signal is sent to first filter 34, second filter 36, and multiplexer 40. First filter 34 exhibits a relatively high input impedance in the lower and higher frequency bands, and a relatively low input impedance in the intermediate frequency band. First filter 34 attenuates the first and third frequency components to provide a first signal to circuit 38. On the other hand, second filter 36 exhibits a relatively high input impedance in the intermediate frequency band, and a relatively low input impedance in the lower and higher frequency bands. Second filter 36 attenuates the second frequency component to provide a second signal to circuit 38. In one embodiment, first filter 34 includes a bandpass filter, for example, a biquad filter. Second filter 36 includes a bandstop filter, for example, a biquad filter.

Circuit 38 detects an energy level for each of the first and second signals, and then sends a signal SELECT to multiplexer 40. If the energy level of the first signal is smaller than that of the second signal, i.e., the noise included in the test information is not negligible compared to the digital FSK signal, multiplexer 40 selects a terminal "0" as an output path, i.e., selects the first signal for output. The digital FSK signal is then processed by first filter 34 to filter out the noise. If the energy level of the first signal is greater than that of the second signal, i.e., the noise is negligible compared to the digital FSK signal, multiplexer 40 selects a terminal "1" as an output path, i.e., selects the digital FSK signal for output. The digital FSK signal then bypasses first filter 34, taking advantage of a recognizable waveform and averting the risk of being distorted by first filter 34.

Device 30 may further include a digital comparator 42, a match filter 44, and a decoder 46. Digital comparator 42 shapes the output of multiplexer 40, i.e., the first signal or the digital FSK signal as selected, into a square-wave. Match filter 44 assigns a logic one to a positive half of the square-wave signal, and a logic zero to a negative half of the square-wave signal. Decoder 46 decodes the output of match filter 46 for a display of the caller ID information.

Generally, caller ID information includes either a type 1 format or a type 2 format. In the type 1 format, an exchanger transmits a channel seizure signal, followed by a mark signal, and then an actual data packet including the caller ID information. In the type 2 format, an exchanger transmits a mark signal followed by a data packet including the caller ID information. The mark signal includes a train of digital ones, and indicates the start of the caller ID information. Since an amplitude twist may be deemed as a high frequency signal, the mark signal, which is composed of all digital ones, would not be adversely affected by an amplitude twist.

Referring again to FIG. 3, as the data packet including the caller ID information undergoes energy detection by circuit 38, the mark signal passes through digital comparator 42 and match filter 44 to decoder 46. Decoder 46 provides a signal MARK to circuit 38. In response to the signal MARK, circuit 38 provides the signal SELECT to multiplexer 40 to select an output path based on the result of energy detection.

FIG. 4 is a block diagram of circuit 38 shown in FIG. 3 in accordance with one embodiment of the present invention. Referring to FIG. 4, circuit 38 includes a first detector 38-2, a second detector 38-4, a comparator 38-6, a counter 38-7, and a flip flop 38-8. First detector 38-2 calculates an energy level of the first signal sent from first filter 34, and second detector 38-4 calculates an energy level of the second signal sent from second filter 36. In one embodiment, the calculation is performed in a formula as follows.

$$E[n]=E[n-1]+|S[n]|\times 2^{-TC}-E[n-1]\times 2^{-TC}$$

wherein E[n] represents an energy level of an n-th sample point in the FINNEGAN digital FSK signal sampled by first filter 34 or second filter 36, S[n] represents an amplitude of an n-th sample point, TC represents a time constant used in calculating an integral of a signal amplitude, and |S[n]| represents the energy level of an n-th sample point when TC is equal to zero. The time constant TC depends on the filter response of first filter 34 and second filter 36.

Comparator 38-6 is coupled to first detector 38-2 and second detector 38-4, and compares the energy levels of the first and second signals. A result of the comparison is sent to flip flop 38-8, for example, a D flip flop. The signal MARK from decoder 46 is sent to counter 38-7 to trigger counter 38-7. Counter 38-7 provides a one-shot signal to a clock terminal CP of flip flop 38-8 to latch the output from comparator 38-6. In response to the rising edge of the one-shot signal, flip flop 38-8 issues the signal SELECT. In one embodiment, in response to the signal MARK, counter 38-7 counts to a predetermined time, for example, 2 times of TC, to allow calculation and comparison of the energy levels.

Figure 5:
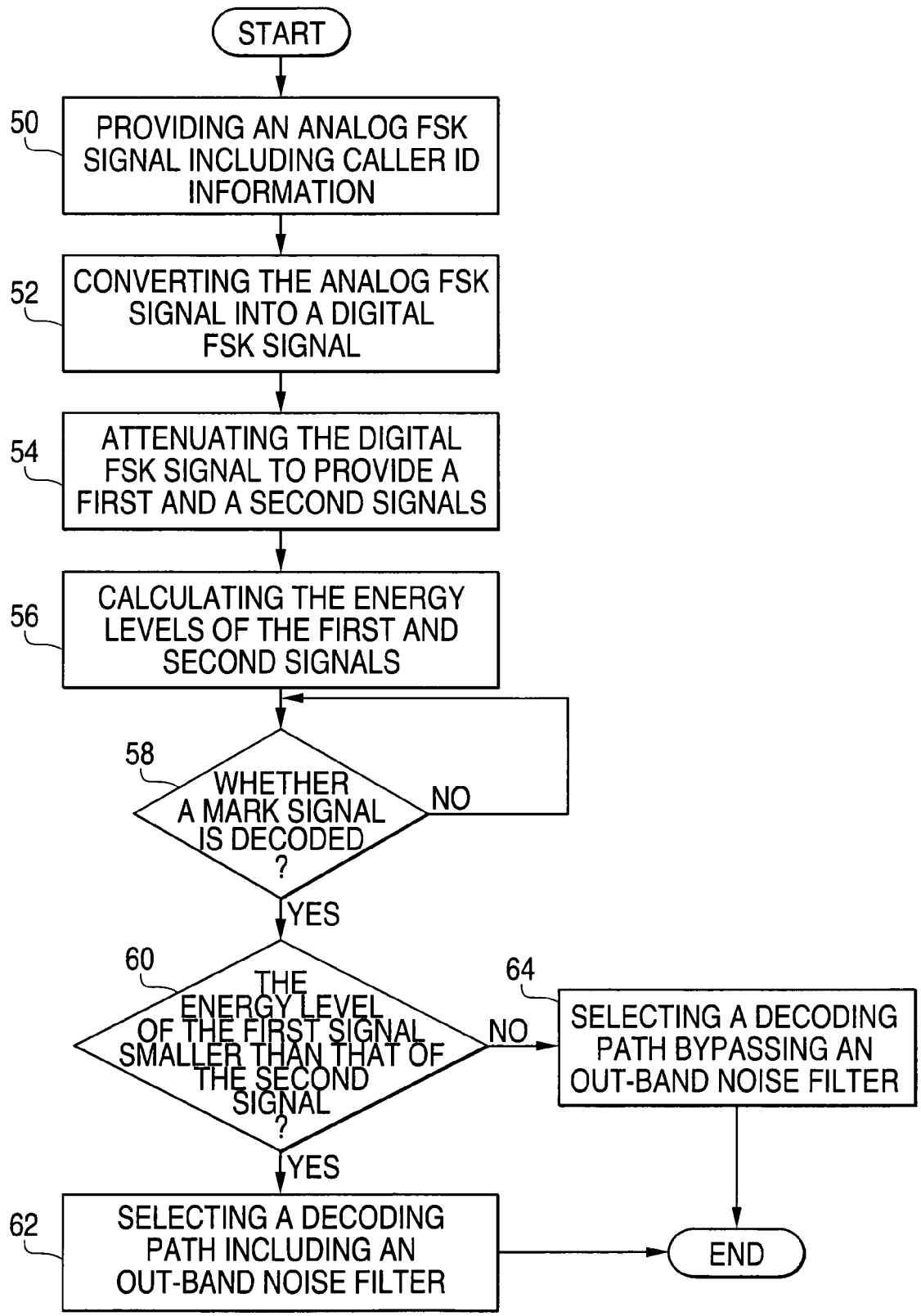
FIG. 5 is a flow diagram illustrating a method in accordance with one embodiment of the present invention.

The present invention also provides a method of processing FSK-modulated caller ID information. FIG. 5 is a flow chart of a method in accordance with one embodiment of the present invention. Referring to FIG. 5, the method begins with providing an analog FSK signal in step 50. The analog FSK signal includes a first frequency component, a second frequency component including the caller ID information, and a third frequency component. At least one of the first or third frequency components includes test information. In step 52, the analog FSK signal is converted into a digital FSK signal. Next, in step 54, the first and third frequency components of the digital FSK signal are attenuated to provide a first signal, and the second frequency component is attenuated to provide a second signal.

In step 56, the method calculates an energy level each of the first and second signals to determine a source of interference. Next, in step 58, the method detects whether a mark signal including a train of digital ones is decoded. In step 60, in response to a decoded mark signal, if the energy level of the first signal is smaller than that of the second signal, it is determined that the source of interference comes from out-band noise. A FSK signal decoding path is then selected in step 62 from an ADC, via a bandpass filter, a digital comparator, and a match filter to a decoder. On the contrary, if the energy level of the first signal is greater than that of the second signal, it is determined that the source of interference comes from an amplitude twist or frequency variation. A FSK signal decoding path is then selected in step 64 from an ADC, via a digital comparator and a match filter to a decoder, bypassing a bandpass filter.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A device for processing a frequency shift keying (FSK) signal including caller ID information comprising:
    an analog-to-digital converter (ADC) converting the FSK signal into a digital FSK signal, the FSK signal further comprising a first frequency component, a second frequency component including the caller ID information, and a third frequency component;
    a first filter attenuating the first and third frequency components of the digital FSK signal to provide a first signal;
    a second filter attenuating the second frequency component of the digital FSK signal to provide a second signal; and
    a circuit calculating an energy level for each of the first and second signals, and selecting the first signal for output if the energy level of the first signal is smaller than that of the second signal, and selecting the digital FSK signal for output if the energy level of the first signal is greater than that of the second signal.

2. The device as claimed in claim 1, the ADC further comprising a sigma-delta modulator modulating the FSK signal in a serial digital stream, and a sinc filter downsampling the serial digital stream.

3. The device as claimed in claim 1, wherein the circuit selects one of the first signal or the digital FSK signal for output in response to a mark signal.

4. The device as claimed in claim 1 further comprising a multiplexer coupled to the circuit for selecting one of the first signal or the digital FSK signal as an output.

5. The device as claimed in claim 1 further comprising a digital comparator for shaping one of the first signal or the digital FSK signal as selected in a square wave.

6. The device as claimed in claim 5 further comprising a match filter coupled to the digital comparator for assigning a logic one to the positive half of the square wave and a logic zero to the negative half of the square wave.

7. The device as claimed in claim 6 further comprising a decoder coupled to the match filter for decoding an output of the match filter.

8. The device as claimed in claim 7 wherein the decoder provides a mark signal to the circuit.

9. A device for processing a frequency shift keying (FSK) modulated caller ID information comprising:
- an analog FSK signal further comprising a first frequency component including test information, and a second frequency component including the caller ID information;
- an analog-to-digital converter (ADC) converting the analog FSK signal into a digital FSK signal;
- a bandpass filter attenuating the first frequency component of the digital FSK signal to provide a first signal;
- a bandstop filter attenuating the second frequency component of the digital FSK signal to provide a second signal; and
- a circuit detecting an energy level each for the first and second signals, comparing the energy levels, and selecting the first signal for output if the energy level of the first signal is smaller than that of the second signal, and selecting the digital FSK signal for output if the energy level of the first signal is greater than that of the second signal.

10. The device as claimed in claim 9, the circuit further comprising a first detector detecting the energy level of the first signal, and a second detector detecting the energy level of the second signal.

11. The device as claimed in claim 9, the circuit further comprising a counter providing a latch signal in response to a mark signal.

12. The device as claimed in claim 11, the circuit further comprising a flip flop providing a select signal in response to the latch signal from the counter.

13. The device as claimed in claim 12, further comprising a multiplexer coupled to the circuit for selecting from the first signal and the digital FSK signal for output in response to the select signal from the circuit.

14. The device as claimed in claim 9, the ADC further comprising a sigma-delta modulator modulating the FSK signal in a serial digital stream, and a sinc filter down-sampling the serial digital stream.

15. The device as claimed in claim 9, the bandpass filter further comprising a biquad filter.

16. The device as claimed in claim 9, the bandstop filter further comprising a biquad filter.

17. A method of processing a frequency shift keying (FSK) modulated caller ID information comprising the steps of:
- providing an analog FSK signal further comprising a first frequency component, a second frequency component including the caller ID information, and a third frequency component;
- converting the analog FSK signal into a digital FSK signal;
- attenuating the first and third frequency components of the digital FSK signal to provide a first signal;
- attenuating the second frequency component of the digital FSK signal to provide a second signal;
- determining an energy level for each of the first and second signals;
- selecting the first signal for output if the energy level of the first signal is smaller than that of the second signal; and
- selecting the digital FSK signal for output if the energy level of the first signal is greater than that of the second signal.

18. The method as claimed in claim 17 further comprising the step of providing a latch signal in response to a mark signal.

19. The method as claimed in claim 17 further comprising the steps of modulating the FSK signal in a serial digital stream and down-sampling the serial digital stream.

20. The method as claimed in claim 17 further comprising the step of providing a mark signal in selecting from the first signal and the digital FSK signal for output.

* * * * *